US008406981B2

(12) United States Patent
Tetsuka et al.

(10) Patent No.: US 8,406,981 B2
(45) Date of Patent: Mar. 26, 2013

(54) ENGINE THROTTLE CONTROL SYSTEM

(75) Inventors: Takashi Tetsuka, Wako (JP); Makoto Tsuyuguchi, Wako (JP); Takeru Abe, Wako (JP); Yukihiro Asada, Wako (JP); Kenichi Machida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 453 days.

(21) Appl. No.: 12/721,061

(22) Filed: Mar. 10, 2010

(65) Prior Publication Data

US 2010/0250094 A1 Sep. 30, 2010

(30) Foreign Application Priority Data

Mar. 24, 2009 (JP) ................................ 2009-072661

(51) Int. Cl.
*F02D 11/10* (2006.01)
*G06F 19/00* (2011.01)

(52) U.S. Cl. ........................ 701/103; 701/110; 123/403

(58) Field of Classification Search .......... 701/102–105, 701/110, 114; 123/361–363, 376, 403, 462
See application file for complete search history.

(56) References Cited

U.S. PATENT DOCUMENTS

| | | | | |
|---|---|---|---|---|
| 7,325,533 | B2 * | 2/2008 | Matsuda | 123/399 |
| 7,703,439 | B2 * | 4/2010 | Russell et al. | 123/434 |
| 8,068,944 | B2 * | 11/2011 | Tanaka | 701/4 |

FOREIGN PATENT DOCUMENTS

| | | |
|---|---|---|
| JP | 61-294152 | 12/1986 |
| JP | 1-211646 A | 8/1989 |
| JP | 11-013516 | 1/1999 |
| JP | 2000-038951 A | 2/2000 |
| JP | 2005-256645 A | 9/2005 |

* cited by examiner

*Primary Examiner* — John T. Kwon
*Assistant Examiner* — Johnny Hoang
(74) *Attorney, Agent, or Firm* — Squire Sanders (US) LLP

(57) ABSTRACT

An operation amount detecting unit 17 detects an operation amount of a throttle grip from a zero position. A basic throttle opening degree computing unit 18 computes a basic throttle opening degree corresponding to the operation amount. A throttle opening degree additional value computing unit 20 outputs as a target throttle opening degree a value obtained by adding the basic throttle opening degree with a throttle opening degree additional value corresponding to the operation amount when the operation of the throttle grip is performed within a small operation region corresponding to an idle operation. The throttle opening degree additional value computing unit 20 outputs as the target throttle opening degree the basic throttle opening degree when the operation of the throttle grip is performed without the small operation region.

12 Claims, 5 Drawing Sheets

16 WATER-TEMPERATURE SENSOR
17 GRIP OPENING DEGREE DETECTING UNIT
18 BASIC THROTTLE OPENING DEGREE COMPUTING UNIT
19 GRIP OPERATING REGION DETECTING UNIT
20 THROTTLE OPENING DEGREE ADDITIONAL VALUE COMPUTING UNIT

16 WATER-TEMPERATURE SENSOR
17 GRIP OPENING DEGREE DETECTING UNIT
18 BASIC THROTTLE OPENING DEGREE COMPUTING UNIT
19 GRIP OPERATING REGION DETECTING UNIT
20 THROTTLE OPENING DEGREE ADDITIONAL VALUE COMPUTING UNIT

ENGINE THROTTLE CONTROL SYSTEM

BACKGROUND

1. Field

Embodiments of the present invention relate to an engine throttle control system. More specifically, certain embodiments relate to an engine throttle control system that can obtain linearity of an amount of change in engine output relative to an amount of change in operation of a throttle operating device.

2. Description of the Related Art

Some conventional engine throttle control systems include an idle air control valve (IACV) that controls an intake air amount of an engine by use of the idle air control valve (see Japanese Patent Application Publication No. Sho 61-294152). The IACV might be provided in a bypass passage communicatively connecting an upstream and a downstream of a throttle valve. In an engine having such a throttle control system, although the intake air amount during an idle operation is controlled by use of the control valve, an intake air amount corresponding to a throttle operation by a driver is controlled by the opening and closing of the throttle valve.

A throttle control system of a so-called throttle-by-wire system (hereinafter, referred to as a "TBW system") detects an operation amount (operation amount from zero) of a throttle operating device (an acceleration pedal or a throttle grip) as an electrical signal by use of a sensor. This throttle control system controls the opening degree of a throttle valve in accordance with the detection signal.

Japanese Patent Application Publication No. Hei 11-13516 (JP '516) describes a throttle control system of the TBW system. The throttle control system described in JP '516 selects a larger one of a target intake air amount calculated on the basis of an acceleration opening degree and an engine speed, and a target intake air amount with load control at deceleration. The throttle control system then calculates a target throttle opening degree on the basis of the target intake air amount thus selected. The throttle control system employs a technique described below in order to eliminate a failure in which, because of a difference between a selected target intake air amount and a target intake air amount corresponding to a torque requested by the driver, a change in the driver's request is not reflected in an output when the selected target intake air amount is large. Specifically, the throttle control system acquires a target torque by adding the driver's requested torque and an engine request torque different from the driver's requested torque, and then determines a target intake air amount on the basis of the target torque.

According to the control system of the TBW system described in JP '516, it is possible to reflect a driver's request within a small throttle opening region in a change in output. However, suppose the simply adding of a throttle opening degree required for the idle operation and a throttle opening degree corresponding to a driver's requested torque, that is, an operation amount of the throttle operating device, in a case where the opening degree of the throttle enters in a middle or large opening region. In this case, a stable correlation between an intake air amount and an operation amount of the throttle operating device, namely, a throttle linearity may not be obtained. To put it differently, the intake air amount sometimes varies even with the same operation amount of the throttle operating device due to the magnitude of the throttle opening degree required for the idle operation.

SUMMARY

Therefore, embodiments of the present invention provide an engine throttle control system that is capable of controlling an intake air amount. That is, the system can control an output or a driving power of an engine with a throttle linearity with respect to an operation amount of a throttle operating device, irrespective of the magnitude of the throttle opening degree required for the idle operation.

One embodiment of the present invention is an engine throttle control system of a TBW system that detects, as an electrical signal, an operation amount of a throttle operating device by use of a sensor. The engine throttle control system can control a throttle opening degree of an engine in accordance with the detection signal. The engine throttle control system includes an operation amount detecting unit configured to detect the operation amount of the throttle operating device from the detection signal of the sensor, a basic throttle opening degree computing unit configured to compute a basic throttle opening degree corresponding to the operation amount, a throttle opening degree additional value computing unit configured to compute a throttle opening degree additional value corresponding to the operation amount of the throttle operating device when the operation amount is within a predetermined small operation region. The system may also include an adding unit configured to add the basic throttle opening degree and the throttle opening degree additional value, a throttle valve driving unit configured to control the throttle opening degree with an output of the adding unit being set as a target throttle opening degree when the operation amount is determined to be within the small operation region, and to control the throttle opening degree with the basic throttle opening degree being set as the target throttle opening degree when the operation amount is determined to exceed the small operation region, and a water-temperature sensor configured to detect a cooling water temperature representing a temperature of the engine. In the engine throttle control system, the throttle opening degree additional value can be set in advance in conjunction with the operation amount of the throttle operating device and the cooling water temperature.

In addition, in another embodiment, the throttle opening degree additional value is set in advance, for example, at a value that is required for an idle operation of the engine when the operation amount is zero, as well as at a value that gradually decreases along with an increase in the operation amount.

Moreover, in one embodiment, the throttle opening degree additional value is set in such a manner as to take a larger value as the cooling water temperature of the engine decreases.

Furthermore, in another embodiment, the throttle operating device is a throttle grip rotatably provided to a steering handle of a motorcycle, and the operation amount is a rotation opening degree of the throttle grip.

Embodiments of the invention may also include a method of throttle control. The method includes detecting, by engine throttle control system of a throttle-by-wire control system, as an electrical signal, an operation amount of a throttle operating device by use of a sensor and controlling a throttle opening degree of an engine in accordance with the detection signal. The method further includes detecting the operation amount of the throttle operating device from the detection signal of the sensor, computing a basic throttle opening degree corresponding to the operation amount, computing a throttle opening degree additional value corresponding to the operation amount of the throttle operating device when the operation amount is within a predetermined small operation region, adding the basic throttle opening degree and the throttle opening degree additional value, controlling the throttle opening degree with an output of the adding being set as a target throttle opening degree when the operation amount is determined to be within the small operation region, and controlling the throttle opening degree with the basic throttle opening degree being set as the target throttle opening degree when the operation amount is determined to exceed the small operation region, and detecting a cooling water temperature representing a temperature of the engine. The throttle opening degree additional value is set in advance in conjunction with the operation amount of the throttle operating device and the cooling water temperature.

DETAILED DESCRIPTION

Figure 2:
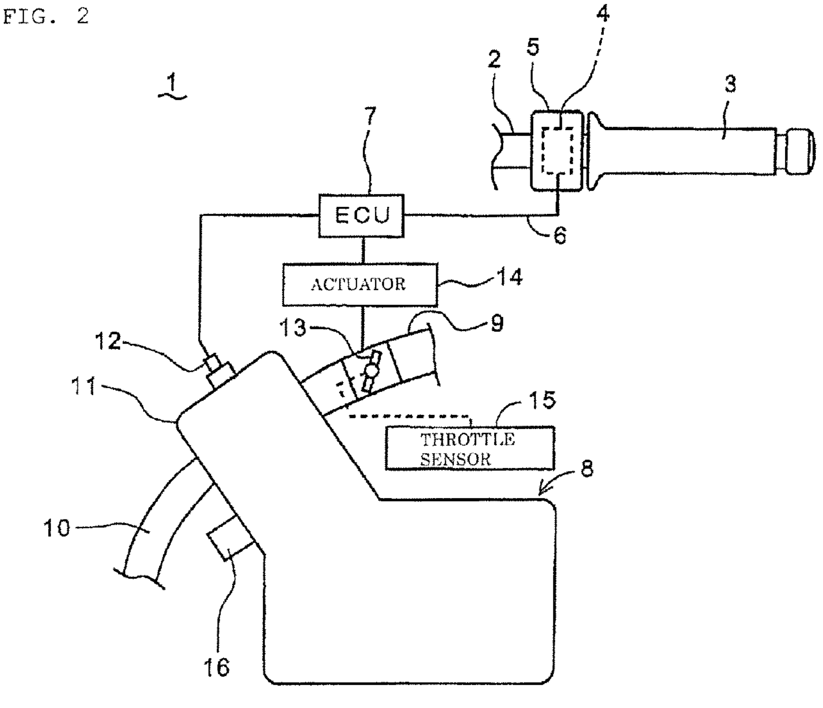
FIG. 2 is a system configuration diagram of the throttle control system according to an embodiment of the present invention.

Hereinafter, embodiments of the present invention will be described with reference to the drawings. FIG. 2 is a schematic configuration diagram of a throttle control system according to one embodiment of the present invention. In FIG. 2, a throttle control system 1 includes a throttle grip 3 provided at a right-side end portion of a pipe-shaped steering handle 2 of a motorcycle. The throttle grip 3 is attached in such a manner as to be rotationally operable relative to an axis of the steering handle 2. The throttle control system 1 is provided with a grip operation amount sensor (grip sensor) 4 that detects an operation amount of the throttle grip 3 (hereinafter referred to as a "grip operation amount"). The grip sensor 4 is housed in a handlebar switch case 5 disposed adjacent to the throttle grip 3 and at the side closer to the center of the vehicle body thereof. A detection output from the grip sensor 4 is inputted to an ECU 7 through a signal line 6.

An engine 8 has a cylinder 11 to which one end of an intake pipe 9 and one end of an exhaust pipe 10 are connected. An unillustrated air cleaner is connected to the other end of the intake pipe 9, and an unillustrated muffler is connected to the other end of the exhaust pipe 10. An ignition plug 12 is provided on a top portion of the cylinder 11. A throttle valve 13 is provided in the intake pipe 9. One end of a support shaft of the throttle valve 13 is connected to an actuator 14, such as a DC motor or the like. In this embodiment, the throttle control system 1 is not a system that drives the throttle valve 13 by mechanically transmitting the rotating operation of the throttle grip 3 to the throttle valve 13 with a wire or the like. Rather, the throttle control system 1 employs a TBW system that rotates the throttle valve 13 with the actuator in accordance with the detection output of the grip sensor 4, and thus changes an opening area of the intake pipe 9. In this manner, an intake air amount to the cylinder 11 is controlled. Moreover, a throttle sensor 15 that detects a rotation angle of the throttle valve 13 is connected to the other end of the support shaft of the throttle valve 13.

In one embodiment, the intake pipe 9 is not provided with a bypass passage that communicatively connects an upstream and a downstream of the throttle valve 13. In other words, the ECU 7 determines both the amount of air required for an idling operation and the amount of air corresponding to the grip operation amount, in accordance only with a change in opening degree (throttle opening degree) of the throttle valve 13.

The engine 8 can be of a water-cooled type and include a water-temperature sensor 16 that detects a cooling water temperature corresponding to the temperature of the engine 8. The ECU 7 includes a microcomputer and drives the actuator 14 on the basis of the engine speed, the stage (gear stage) of the transmission, and the output signal (the grip operation amount or the grip opening degree) from the grip sensor 4 so that the opening degree of the throttle valve 13 is optimized in conformity with desired engine operating conditions. Besides controlling the opening degree of the throttle valve 13, the ECU 7 controls the ignition timing of the ignition plug 12 as well as the fuel injection amount and fuel injection timing of an unillustrated fuel injection device provided on the exhaust pipe 9.

Figure 1:
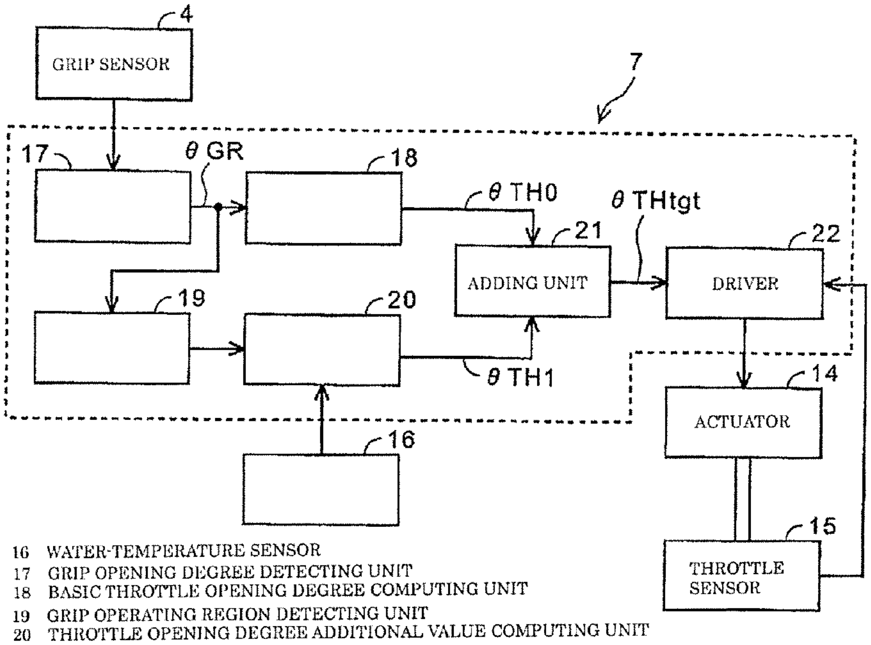
FIG. 1 is a block diagram showing functions of a throttle control system according to an embodiment of the present invention.

FIG. 1 is a block diagram showing functions of certain units of the ECU 7 according to one embodiment. In FIG. 1, a grip opening degree detecting unit 17 detects a grip rotation amount (hereinafter, referred to as a "grip opening degree") $\theta GR$ from the detection output of the grip sensor 4. A basic throttle opening degree computing unit computes a basic throttle opening degree $\theta TH0$ corresponding to the grip opening degree $\theta GR$ inputted thereto from the grip opening degree detecting unit 17. The basic throttle opening degree computing unit 18 may include a basic map storing the basic throttle opening degree $\theta TH0$ corresponding to the grip opening degree $\theta GR$.

A grip operating region detecting unit 19 detects whether the grip opening degree $\theta GR$ is within a region (referred to as a small operation region) ranging from zero degree (an opening degree corresponding to the idle operation of the engine) to a predetermined small degree. When it is detected that the grip operation is performed within the small operation region, the grip operating region detecting unit 19 inputs a signal indicating the operation within the small operation region to a throttle opening degree additional value computing unit 20.

In response to the signal indicating the operation within the small operation region, the throttle opening degree additional value computing unit 20 computes a throttle opening degree additional value $\theta TH1$ corresponding to the grip opening degree $\theta GR$. The throttle opening degree additional value computing unit 20 may include an additional value map storing the throttle opening degree additional value $\theta TH1$ corresponding to the grip opening degree $\theta GR$. Note that different throttle opening degree additional values $\theta TH1$ may be set respectively for engine cooling water temperature regions that are set in advance. In other words, this configuration makes it possible to select a larger throttle opening degree additional value $\theta TH1$ when the engine cooling water temperature is within a low-temperature region than that for an engine cooling water temperature within a high-temperature region. The throttle opening degree additional value computing unit 20 acquires a detection signal of the water-temperature sensor 16 so as to be capable of selecting the throttle opening degree additional value $\theta TH1$ for each of the engine cooling water temperature regions.

According to certain embodiments, an adding unit 21 adds the basic throttle opening degree θTH0 outputted from the basic throttle opening degree computing unit 18 and the corresponding throttle opening degree additional value θTH1 outputted from the throttle opening degree additional value computing unit 20. The adding unit then outputs a target throttle opening degree θTHtgt thus obtained.

In one embodiment, the target throttle opening degree θTHtgt is inputted to a driver 22 that is a driving unit of the actuator 14. In accordance with a difference between the target throttle opening degree θTHtgt and the opening degree θTH of the throttle valve 13 detected by the throttle sensor 15, the driver 22 gives a driving instruction to the actuator 14 by feeding back thereto such a throttle opening degree that the difference should be converged to zero.

Figure 3:
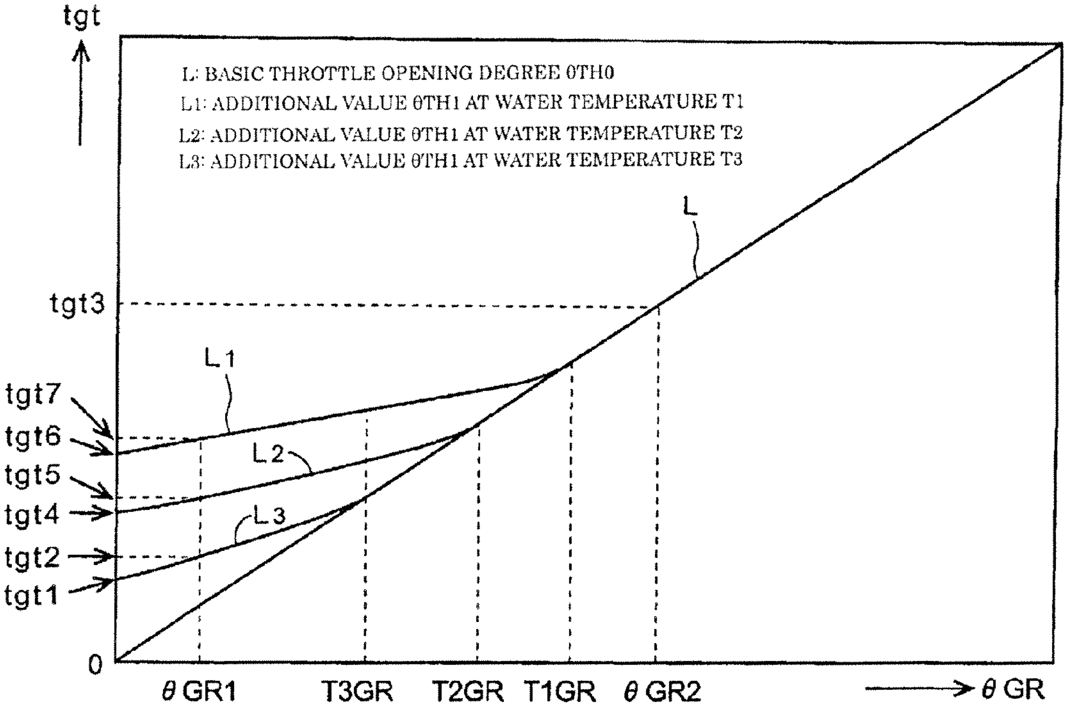
FIG. 3 is a graph showing a relationship between a throttle operation amount (a grip opening degree) and a target throttle opening degree.

FIG. 3 is a graph showing a relationship between the grip opening degree θGR and the target throttle opening degree θTHtgt, according to one example. In FIG. 3, the lateral axis indicates the grip opening degree θGR, and the vertical axis indicates the target throttle opening degree θTHtgt. It should be noted that the target throttle opening degree θTHtgt is denoted by reference sign (tgt) to avoid complexity in FIG. 3.

In the example of FIG. 3, the basic throttle opening degree θTH0 indicated by the line L changes linearly with respect to the grip opening degree θGR. When the grip opening degree θGR is zero, the basic throttle opening degree θTH0 is also zero. The target throttle opening degree θTHtgt is set by adding the corresponding throttle opening degree additional value θTH1 to the basic throttle opening degree θTH0.

The throttle opening degree additional values θTH1 indicated by the lines L1, L2, and L3 are set in accordance with values of the grip opening degree θGR, respectively, for engine cooling water temperature regions T1, T2, and T3 (T3>T2>T1). The throttle opening degree additional value θTH1 expressed by the difference between the line L and each of the lines L1 to L3 decreases along with an increase in the grip opening degree θGR, as can be understood from FIG. 3. When the throttle opening degree additional value θTH1 becomes equal to the basic throttle opening degree θTH0, the throttle opening degree additional value θTH1 for the corresponding cooling water temperature region becomes zero. The basic throttle opening degree θTH0 becomes equal to the target throttle opening degree θTHtgt. For example, the grip opening degree θGR making the throttle opening degree additional value θTH1 zero is set at a grip opening degree T1GR in the low temperature region T1, a grip opening degree T2GR in the middle temperature region T2, and a grip opening degree T3GR in the high temperature region T3. In the illustrated example, the grip opening degree T1GR is 30°, the grip opening degree T2GR is 25°, and the grip opening degree T3GR is 15°.

Consider a case where the engine cooling water temperature is in the high temperature region and the grip opening degree θGR is zero during the idle operation. In this case, while the basic throttle opening degree θTH0 indicated by the line L is zero, the additional value indicated by the line L3 is added thereto. Thereby, the throttle valve 13 is controlled so that its opening degree should be converged to the target throttle opening degree θTHtgt1. Then, once the grip opening degree θGR is opened to have a value θGR1, the throttle valve 13 is controlled so that its opening degree should be converged to a target throttle opening degree θTHtgt2 obtained by the addition of the additional value indicated by the line L3 corresponding to the grip opening degree θGR1. Further, when the grip opening degree θGR has a value (for example, θGR2) not less than T3GR)(15°, the additional value is zero. Accordingly, the throttle valve 13 is controlled so that its opening degree should be converged to the target throttle opening degree θTHtgt3 (equal to the basic throttle opening degree θTH0) determined by the line L linearly changing in accordance with the grip opening degree θGR.

Moreover, in one embodiment, when the engine cooling water temperature is in the middle temperature region and the grip opening degree θGR is zero, the throttle valve 13 is controlled so that its opening degree should be converged to the target throttle opening degree θTHtgt4. Then, once the grip opening degree θGR is opened to have a value θGR1, the throttle valve 13 is controlled so that its opening degree should be converged to a target throttle opening degree θTHtgt5 obtained by the addition of the additional value indicated by the line L2 corresponding to the grip opening degree θGR1. Moreover, when the grip opening degree θGR has a value (for example, θGR2) not less than T2GR, the additional value is zero. Accordingly, the throttle valve 13 can be controlled so that its opening degree is converged to the target throttle opening degree θTHtgt3 determined by the line L linearly changing in accordance with the grip opening degree θGR.

Furthermore, when the engine cooling water temperature is in the low temperature region and the grip opening degree θGR is zero, the throttle valve 13 is controlled so that its opening degree should be converged to the target throttle opening degree θTHtgt6. Then, once the grip opening degree θGR is opened to have a value θGR1, the throttle valve 13 is controlled so that its opening degree should be converged to a target throttle opening degree θTHtgt7 obtained by the addition of the additional value indicated by the line L1 corresponding to the grip opening degree θGR1. Moreover, when the grip opening degree θGR has a value (for example, θGR2) not less than T1GR, the additional value is zero. Accordingly, the throttle valve 13 can be controlled so that its opening degree is converged to the target throttle opening degree θTHtgt3 determined by the line L linearly changing in accordance with the grip opening degree θGR.

As shown in the example of FIG. 3, when the grip opening degree θGR is zero, the throttle opening degree additional value θTH1 becomes the target throttle opening degree θTHtgt1, θTHtgt4 or θTHtgt6 for each of the engine cooling water regions. Each of the target throttle opening degree θTHtgt1, θTHtgt4 and θTHtgt6 is an opening degree required for the idle operation of the engine 8.

Figure 4:
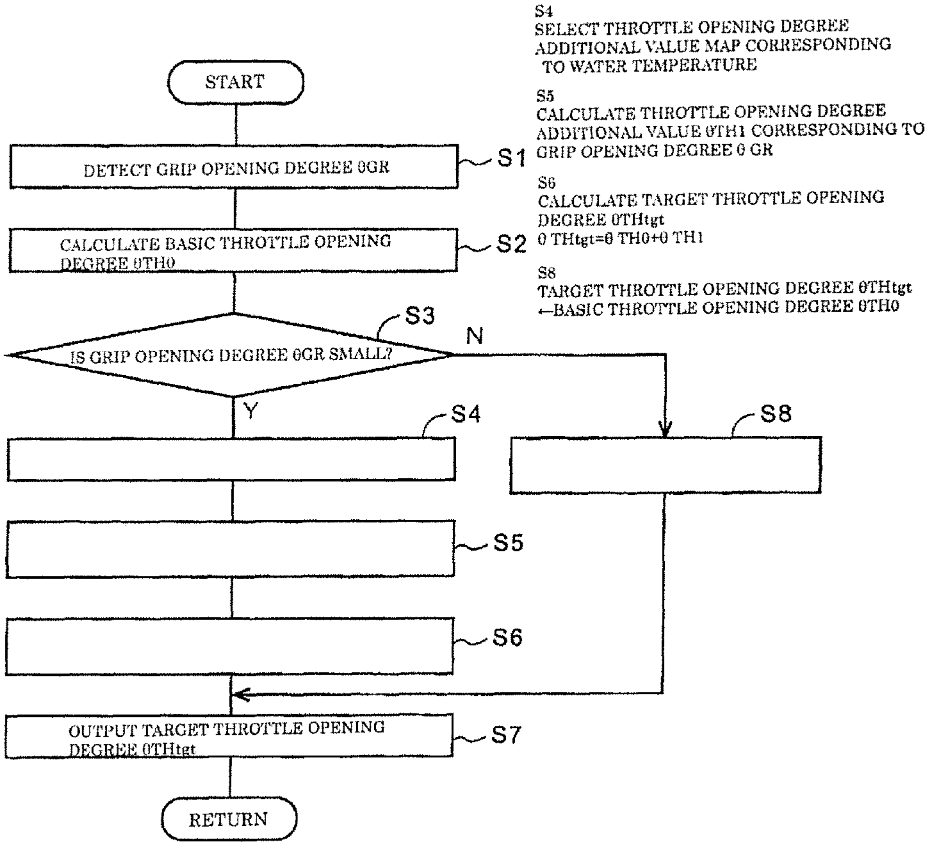
FIG. 4 is a flowchart showing processing by units of the throttle control system.

FIG. 4 is a flowchart showing the processing by the units of ECU 7, according to one embodiment. In FIG. 4, in Step S1, the grip opening degree θGR is detected. In Step S2, the basic throttle opening degree θTH0 is calculated on the basis of the grip opening degree θGR. In Step S3, it is determined whether or not the grip opening degree θGR is within an expected small operation region. If YES in Step S3, the processing proceeds to Step S4. If NO in Step S3, the processing proceeds to Step S8.

In Step S4, the throttle opening degree additional value map corresponding to the cooling water temperature of the engine 8 is selected. In Step S5, the throttle opening degree additional value θTH1 corresponding to the grip opening degree θGR is calculated using the throttle opening degree additional value map thus selected in Step S4. In Step S6, the target throttle opening degree θTHtgt is calculated by adding the basic throttle opening degree θTH0 and the throttle opening degree additional value θTH1. In Step S7, the target throttle opening degree θTHtgt thus calculated is outputted to the driver 22.

In Step S8, the basic throttle opening degree θTH0 calculated in Step S2 is set as the target throttle opening degree θTHtgt. After Step S8, the processing proceeds to Step S7.

Accordingly, in this case, the basic throttle opening degree θTH0 is outputted to the driver 22 as the target throttle opening degree θTHtgt.

It should be noted that a process according to whether a throttle valve is "opened" or "fully closed" is sometimes performed in the control of a vehicle including an engine control. In such a process, the throttle valve is determined to be "opened" when the throttle valve is opened with its throttle opening degree exceeding a predetermined value. On the other hand, the throttle valve is determined to be "fully closed" when its throttle opening degree is below the predetermined value. However, in the throttle control of the TBW system, the throttle valve 13 is kept open by an opening degree sufficient for obtaining an amount of air required for the idle operation, irrespective of the will of the rider, and even when the throttle grip 3 is not being operated (the grip opening degree GR is zero). For this reason, it cannot be determined whether the throttle valve is opened by the will of the rider or not in accordance with the value zero of the throttle opening degree as a reference.

In this regard, in the throttle control of the TBW system, the determination as to whether the throttle valve is opened by the will of the rider is performed as described below. An opening degree (an idle opening degree) required for the supply of an amount of air for the maintaining of the idle rotation is used as a reference. When the throttle opening degree exceeds the idle opening degree by a predetermined value or more, the throttle is determined to be "opened." On the other hand, when the throttle opening degree does not exceed the predetermined value with the idle opening degree as the reference, the throttle is determined to be "fully closed."

Figure 5:
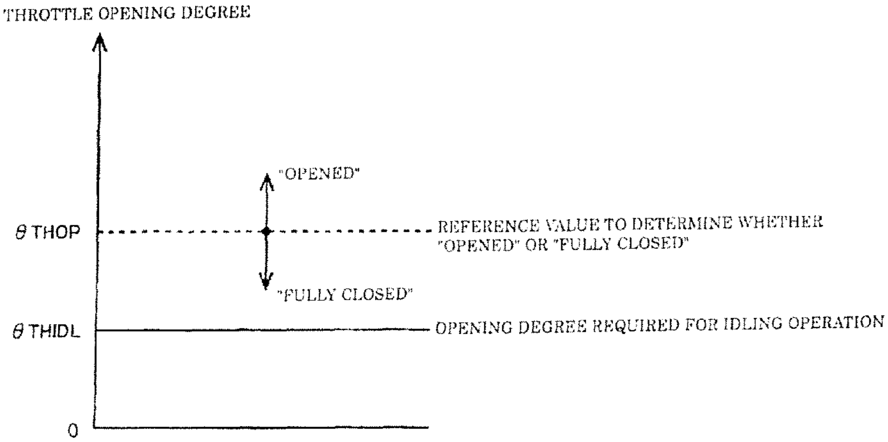
FIG. 5 is a graph showing a method for setting reference values respectively for an "opened" state and a "fully-closed" state of a throttle opening degree.

Specifically, in the example of FIG. 5, a throttle opening degree θTHIDL is a throttle opening degree (idle opening degree) required for the idle operation. A throttle opening degree θTHOP is a reference opening degree for the determination as to whether the throttle valve 13 is "opened" or "fully closed."

In one embodiment, the control on the speed of the DC motor as the actuator for driving the throttle valve 13 is performed generally by a PWM (pulse-width modulation) control by the driver 22. In the PWM control, a switching control is performed to turn the power source of the DC motor ON and OFF. The motor speed is controlled by thus changing the power to be supplied to the DC motor in accordance with the ON-time duty (the ratio of the ON time).

In the PWM control, a switching frequency may be set at a high frequency of approximately 5 kHz, for example, in order to enhance the control performance. This case, however, brings about a problem of the occurrence of a unique high noise owing to the high frequency. In this embodiment, instead of the PWM control, a DSM (ΔΣ modulation: delta-sigma modulation) control may be performed on a control output to the DC motor, so that a high frequency is applied only to a necessary region but a low frequency is applied to the regions other than the necessary region. In other words, the driving frequency varies. With the variation in the driving frequency, a high frequency noise of the motor is suppressed, and thus, an uncomfortable condition can be avoided. A ΔΣ modulation circuit can be formed of an integrating circuit and a quantizer, and is a known circuit that feeds back a quantization error of the quantizer to an input of the integration circuit.

Figure 6:
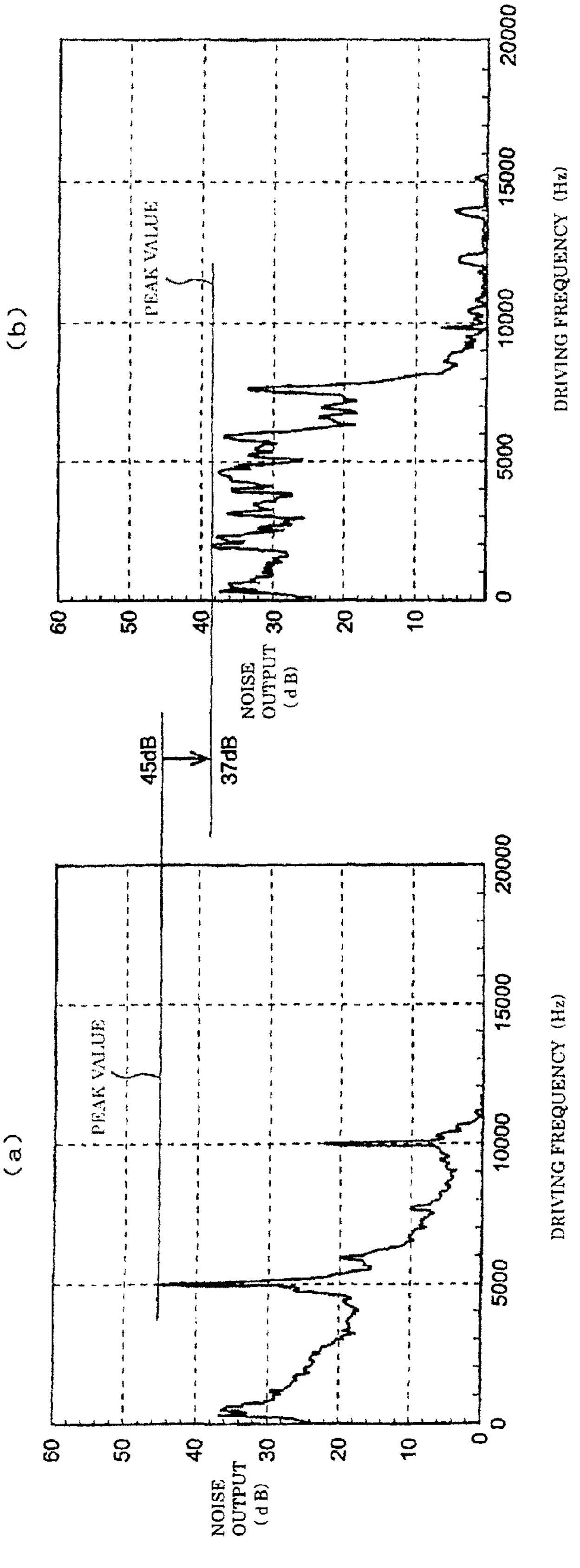
FIG. 6 is a graph showing an example of an output noise when a ΔΣ modulation circuit is used in a motor input circuit.

FIG. 6 illustrates graphs showing a noise output for a driving frequency in the case where the speed control of the DC motor is performed by the DSM control, according to one embodiment. For comparison, FIG. 6(*a*) shows a noise output for each frequency according to the PWM control. FIG. 6(*b*) shows a noise output for each frequency according to the DSM control. As shown in FIG. 6, the DSM control causes the output frequencies to scatter, thereby reducing the peak value from 45 dB to 37 dB, and thus makes it possible to avoid the occurrence of an uncomfortable noise.

It should be noted that, although the additional value θTH1 corresponding to the grip opening degree θGR is obtained by referring to the additional value map shown in FIG. 3 in the above-described embodiment, the target throttle opening degree may be obtained by the following equation:

(Throttle Target Opening Degree)=(Throttle Opening Degree(Set Value for each Engine Cooling Water Temperature)Required for Idle Operation)×(Correction Coefficient)+(Grip Opening Degree) (Equation 1).

Figure 7:
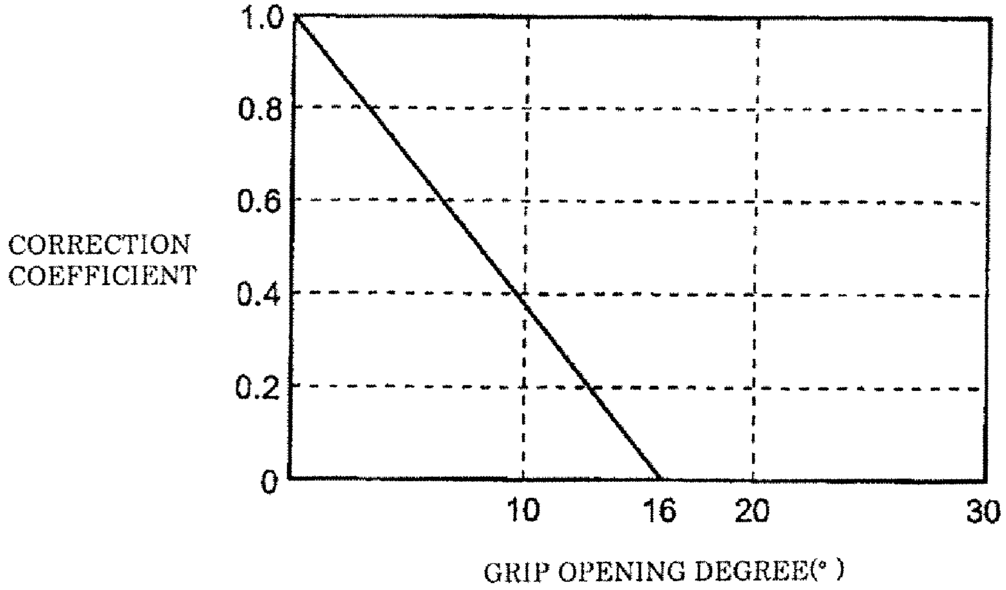
FIG. 7 is a graph showing aspects of an additional value correction coefficient corresponding to a grip opening degree.

FIG. 7 is a graph showing aspects of an additional value correction coefficient according to the grip opening degree θGR used in Equation 1. In FIG. 7, the correction coefficient is "1.0" when the grip opening degree θGR is "zero" degree. The correction coefficient can be set in advance to take a smaller value as the grip opening degree θGR increases. In this example, the correction coefficient is "zero" when the grip opening degree θGR is 16°; accordingly, the target throttle opening degree is determined on the basis of only the grip opening degree θGR.

As a result of certain embodiments, when the operation amount (rotation angle) of the throttle operating device (the throttle grip) is small, a target throttle opening degree is obtained by adding a predetermined additional value to a throttle opening degree required for an idle operation. Even when the operation amount is increased, an additional value corresponding to the operation amount is added as long as the operation amount is within the small operation region up to a predetermined operation amount. Thereafter, once the throttle opening degree enters in a middle or large opening degree region, the addition is not performed. With this configuration, the throttle operation amount and the intake air amount are made to have a more linear relationship, and also, are made mutually smooth and continuous during the idle operation and an operation after the idle operation. As a result, the throttle linearity can be improved.

In particular, since the throttle opening degree additional value is determined in conjunction with the operation amount of the throttle operating device and the engine cooling water temperature, the throttle linearity can be further improved.

DESCRIPTION OF REFERENCE NUMERALS

1 . . . throttle control system, 2 . . . steering handle, 3 . . . throttle grip, 4 . . . grip sensor, 7 . . . ECU, 8 . . . engine, 9 . . . intake pipe, 13 . . . throttle valve, 14 . . . actuator, 15 . . . throttle sensor, 16 . . . water-temperature sensor, 17 . . . grip opening degree detecting unit, 18 . . . basic throttle opening degree computing unit, 19 . . . grip operating region detecting unit, 20 . . . throttle opening degree additional value computing unit, 21 . . . adding unit

We claim:

1. An engine throttle control system of a throttle-by-wire control system, the engine throttle control system configured to detect, as an electrical signal, an operation amount of a throttle operating device by use of a sensor and control a throttle opening degree of an engine in accordance with the detection signal, the engine throttle control system comprising:

an operation amount detecting unit configured to detect the operation amount of the throttle operating device from the detection signal of the sensor;

a basic throttle opening degree computing unit configured to compute a basic throttle opening degree corresponding to the operation amount;

a throttle opening degree additional value computing unit configured to compute a throttle opening degree additional value corresponding to the operation amount of the throttle operating device, when the operation amount is within a predetermined small operation region;

an adding unit configured to add the basic throttle opening degree and the throttle opening degree additional value;

a throttle valve driving unit configured to control the throttle opening degree with an output of the adding unit being set as a target throttle opening degree when the operation amount is determined to be within the small operation region, and to control the throttle opening degree with the basic throttle opening degree being set as the target throttle opening degree when the operation amount is determined to exceed the small operation region; and a water-temperature sensor configured to detect a cooling water temperature representing a temperature of the engine, wherein the throttle opening degree additional value is set in advance in conjunction with the operation amount of the throttle operating device and the cooling water temperature.

2. The engine throttle control system according to claim 1, wherein the throttle opening degree additional value is set in advance, at a value that is required for an idle operation of the engine when the operation amount is zero, and at a value that gradually decreases along with an increase in the operation amount.

3. The engine throttle control system according to claim 1, wherein the throttle opening degree additional value is set to take a larger value as the cooling water temperature of the engine decreases.

4. The engine throttle control system according to claim 1, wherein the throttle operating device is a throttle grip rotatably provided to a steering handle of a motorcycle, and the operation amount is a rotation opening degree of the throttle grip.

5. A method, comprising:

detecting, by engine throttle control system of a throttle-by-wire control system, as an electrical signal, an operation amount of a throttle operating device by use of a sensor and controlling a throttle opening degree of an engine in accordance with the detection signal;

detecting the operation amount of the throttle operating device from the detection signal of the sensor;

computing a basic throttle opening degree corresponding to the operation amount;

computing a throttle opening degree additional value corresponding to the operation amount of the throttle operating device when the operation amount is within a predetermined small operation region;

adding the basic throttle opening degree and the throttle opening degree additional value;

controlling the throttle opening degree with an output of the adding being set as a target throttle opening degree when the operation amount is determined to be within the small operation region, and controlling the throttle opening degree with the basic throttle opening degree being set as the target throttle opening degree when the operation amount is determined to exceed the small operation region; and detecting a cooling water temperature representing a temperature of the engine, wherein the throttle opening degree additional value is set in advance in conjunction with the operation amount of the throttle operating device and the cooling water temperature.

6. The method according to claim 5, wherein the throttle opening degree additional value is set in advance, at a value that is required for an idle operation of the engine when the operation amount is zero, and at a value that gradually decreases along with an increase in the operation amount.

7. The method according to claim 5, wherein the throttle opening degree additional value is set to take a larger value as the cooling water temperature of the engine decreases.

8. The method according to claim 5, wherein the throttle operating device is a throttle grip rotatably provided to a steering handle of a motorcycle, and the operation amount is a rotation opening degree of the throttle grip.

9. An engine throttle control system of a throttle-by-wire control system that detects, as an electrical signal, an operation amount of a throttle operating device by use of a sensor and controls a throttle opening degree of an engine in accordance with the detection signal, the engine throttle control system comprising:

operation amount detecting means for detecting the operation amount of the throttle operating device from the detection signal of the sensor;

basic throttle opening degree computing means for computing a basic throttle opening degree corresponding to the operation amount;

throttle opening degree additional value computing means for computing a throttle opening degree additional value corresponding to the operation amount of the throttle operating device when the operation amount is within a predetermined small operation region;

adding means for adding the basic throttle opening degree and the throttle opening degree additional value;

throttle valve driving means for controlling the throttle opening degree with an output of the adding means being set as a target throttle opening degree when the operation amount is determined to be within the small operation region, and controlling the throttle opening degree with the basic throttle opening degree being set as the target throttle opening degree when the operation amount is determined to exceed the small operation region; and a water-temperature sensor means for detecting a cooling water temperature representing a temperature of the engine, wherein the throttle opening degree additional value is set in advance in conjunction with the operation amount of the throttle operating device and the cooling water temperature.

10. The engine throttle control system according to claim 9, wherein the throttle opening degree additional value is set in advance, at a value that is required for an idle operation of the engine when the operation amount is zero, and at a value that gradually decreases along with an increase in the operation amount.

11. The engine throttle control system according to claim 9, wherein the throttle opening degree additional value is set to take a larger value as the cooling water temperature of the engine decreases.

12. The engine throttle control system according to claim 9, wherein the throttle operating device is a throttle grip rotatably provided to a steering handle of a motorcycle, and the operation amount is a rotation opening degree of the throttle grip.

* * * * *